United States Patent
Kodaypak et al.

(10) Patent No.: US 9,992,654 B2
(45) Date of Patent: Jun. 5, 2018

(54) POLICY DRIVEN EMERGENCY TRAFFIC HANDLING FOR MACHINE-TO-MACHINE DEVICE COMMUNICATION

(71) Applicant: AT&T Intellectual Property I, L.P., Atlanta, GA (US)

(72) Inventors: Rajendra Prasad Kodaypak, Sammamish, WA (US); Joseph Dahan, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

(21) Appl. No.: 15/143,385

(22) Filed: Apr. 29, 2016

(65) Prior Publication Data

US 2017/0318445 A1    Nov. 2, 2017

(51) Int. Cl.
| | | |
|---|---|---|
| H04W 4/22 | (2009.01) | |
| H04M 3/51 | (2006.01) | |
| H04W 4/00 | (2018.01) | |
| H04W 76/00 | (2018.01) | |
| H04W 28/02 | (2009.01) | |

(52) U.S. Cl.
CPC ......... H04W 4/22 (2013.01); H04M 3/5116 (2013.01); H04W 4/005 (2013.01); H04W 28/0289 (2013.01); H04W 76/007 (2013.01)

(58) Field of Classification Search
CPC ..... H04W 4/005; H04W 4/22; H04W 76/007; H04W 28/0289; H04M 3/5116
See application file for complete search history.

(56) References Cited

U.S. PATENT DOCUMENTS

| | | |
|---|---|---|
| 9,094,816 B2 | 7/2015 | Maier et al. |
| 9,143,253 B2 | 9/2015 | Venkatachalam et al. |
| 9,148,746 B2 | 9/2015 | Raouf et al. |
| 2013/0042011 A1 | 2/2013 | Sugizaki et al. |
| 2013/0149987 A1 | 6/2013 | Cheng et al. |
| 2013/0336111 A1 | 12/2013 | Vos et al. |
| 2014/0189001 A1 | 7/2014 | Tyagi et al. |
| 2014/0355428 A1 | 12/2014 | Smith et al. |

(Continued)

OTHER PUBLICATIONS

Militeau et al., "M2M and the Internet of Things (IoT) The impact on Public Safety," Emerging Technology Forum, Nov. 17-18, 2015, APCO International.

*Primary Examiner* — Olumide T Ajibade Akonai
*Assistant Examiner* — Margaret G Mastrodonato
(74) *Attorney, Agent, or Firm* — Hartman & Citrin LLC

(57) ABSTRACT

Concepts and technologies disclosed herein are directed to policy driven emergency traffic handling for machine-to-machine ("M2M") device communication. According to one aspect of the concepts and technologies disclosed herein, an M2M application server can receive a plurality of emergency messages from a mobility management entity ("MME") over a control plane interface. The plurality emergency message can be generated by a plurality of M2M devices in response to an emergency event. The M2M application server can filter, based upon a policy, the plurality of emergency messages to remove duplicate messages of the plurality of emergency messages in order to create a clean group of emergency messages. The M2M application server can forward the clean group of emergency messages to at least one public safety answering point ("PSAP").

18 Claims, 7 Drawing Sheets

(56) References Cited

U.S. PATENT DOCUMENTS

2014/0372147 A1* 12/2014 White ............... G06F 17/30477
                                                          705/3
2015/0029854 A1   1/2015  Starsinic et al.
2015/0118996 A1   4/2015  Shaw
2016/0007137 A1   1/2016  Ahn et al.

* cited by examiner

POLICY DRIVEN EMERGENCY TRAFFIC HANDLING FOR MACHINE-TO-MACHINE DEVICE COMMUNICATION

BACKGROUND

The Internet of Things ("IoT") is anticipated to be the next major revolution in the high-speed mobile communications and connectivity industry. A variety of IoT services are likely to be a key growth engine for next generation cellular systems. According to recent studies, approximately 25% of the 20+ billion connected devices that will be deployed globally will fall under the low power cellular ecosystems.

SUMMARY

Concepts and technologies disclosed herein are directed to policy driven emergency traffic handling for M2M device communication. According to one aspect of the concepts and technologies disclosed herein, an M2M application server can receive, from a mobility management entity ("MME") over a control plane interface, a plurality of emergency messages originating from a plurality of M2M devices. The control plane interface can include an MME to M2M application service control plane interface dedicated to control plane message interactions between the MME and the M2M application server.

The plurality of emergency messages are generated by the plurality of M2M devices in response to an emergency event. The M2M application server can filter, based upon a policy, the plurality of emergency messages to remove duplicate messages of the plurality of emergency messages in order to create a clean group of emergency messages. The M2M application server also can forward the clean group of emergency messages to at least one public safety answering point ("PSAP"). In some embodiments, the M2M application server can prioritize at least a portion of the plurality of emergency messages prior to forwarding to the PSAP(s).

The emergency event can be any bona fide emergency or any situation an individual or entity perceives to be an emergency (as is typical of 9-1-1 service). By way of example, and not limitation, the emergency event can be any serious situation where a law enforcement officer, fire fighter, or emergency medical help is needed right away and a call or other communication with the National Emergency Number Association ("NENA"; also known as The 9-1-1 Association) is warranted. The emergency event can be a real-world disaster and/or crisis such as, for example, a hurricane, tsunami, earthquake, tornado, other natural disaster, disease epidemic, and the like.

Each of the plurality of emergency messages can include data. The data can include a type of the emergency event, a priority of the emergency message, an identity of a corresponding one of the plurality of machine-to-machine devices, a location of the corresponding one of the plurality of machine-to-machine devices, a device category, and a device type of the corresponding one of the plurality of machine-to-machine devices. The M2M application server can analyze the plurality of emergency messages to extract the data. The M2M application server can create a mapping table based upon the data. The M2M application server can forward emergency messages to the PSAP(s) based upon the mapping table.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
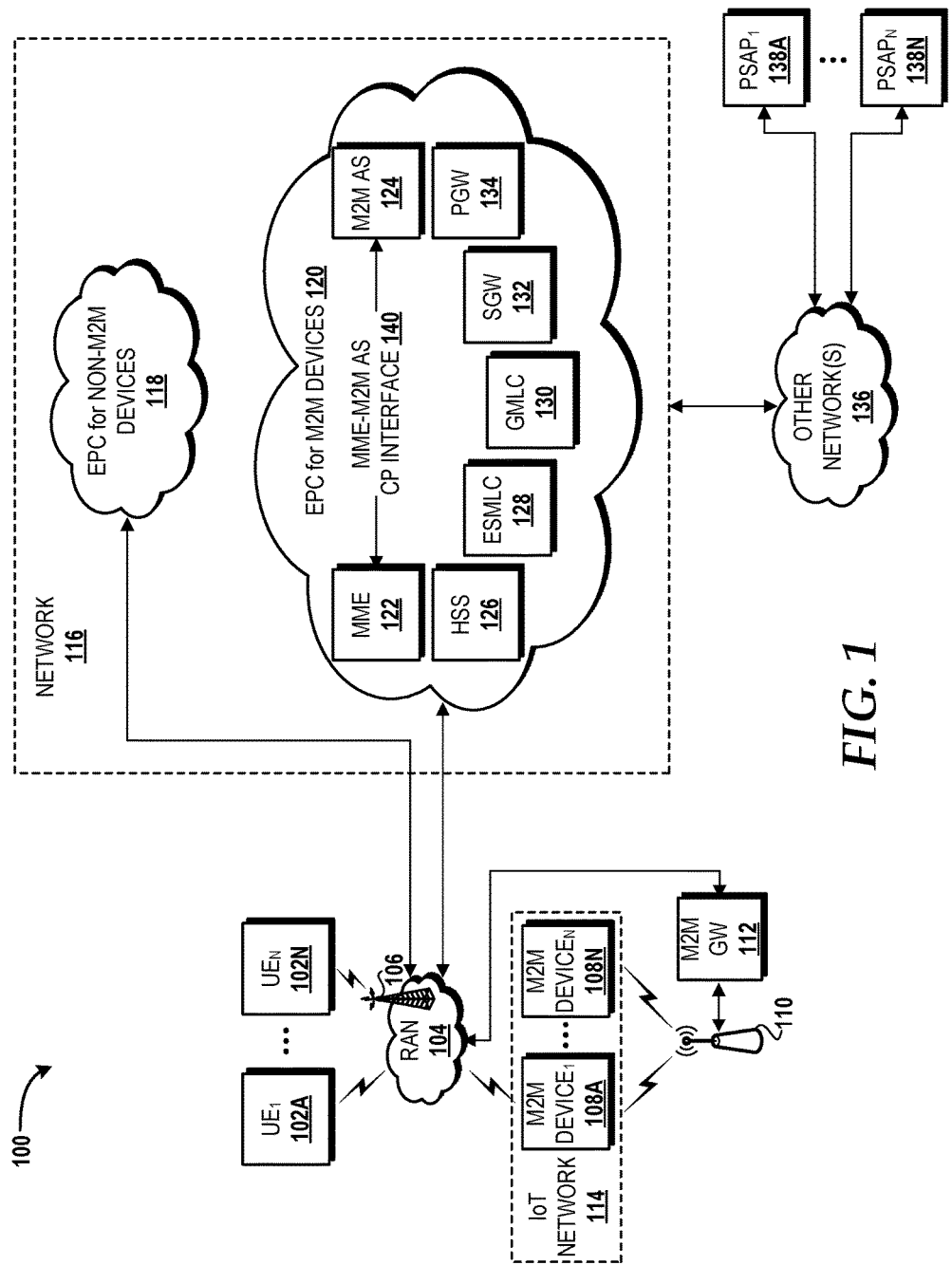
FIG. 1 is a block diagram illustrating aspects of an operating environment in which the concepts and technologies disclosed herein can be implemented.

The concepts and technologies disclosed herein provide an integrated dynamic policy driven mechanism within an M2M application server for handling M2M device-generated control plane signaling that can take into account, among other things, the device category, nature of emergency alert, content type during such alert, and location to steer associated traffic to the local emergency/public safety service providers. Such an intelligent mechanism in the M2M application server enables fair treatment to be given to a broader class of M2M devices requesting emergency IoT services.

In long-term evolution ("LTE") based cellular systems, the MME acts as the nucleus for routing control plane signaling traffic to and from its peer nodes to provide a variety of mobility services. As LTE evolved packet core ("EPC") networks evolve to support a variety of M2M devices in getting connectivity to the network, the resultant increase in signaling traffic demands intelligent and flexible control plane routing designs to be able to protect the incumbent services as well to deliver next generation IoT services.

In a conventional LTE network, the MME performs critical mobility and session management functions to be able to successfully complete the signaling procedures interworking with its peer network elements. When a large volume of LTE-capable M2M devices with mixed category types connect to the radio access network ("RAN") elements and the serving MME, these devices could be distributed across multiple tracking areas ("TAs") that are configured in the MME. During emergency scenarios, when several such M2M devices across these TAs need to attach to the LTE network to send and receive critical information, the serving MME(s) could be overloaded if adequate M2M device specific control plane procedural prioritization and throttling mechanisms are not in place.

When a large volume of M2M devices that belong to a specific service provider need to report their emergency alerts in conjunction with other types of M2M devices, smartphones, and other devices involved in active data exchange, the MME should have the capability to distinguish between various types of machines/devices and traditional mobile users based upon a set of systemic attributes and dynamic policies. The MME can then relay the emergency messages from all such devices towards the M2M application server via control plane data transfer.

The lack of IoT service specific dynamic policy triggers in the M2M application server based upon M2M device category, priority, mobility management state identified via device specific context in the MME visited location register ("VLR"), emergency triggers and location attributes (e.g., cell global identifier and tracking area identifier) could impact the M2M application server's internal message handling/routing capability towards the local public safety authorities (e.g., PSAPs). If the PSAPs are not equipped with adequate message handling capabilities to handle the signaling volumes generated by the MME application server, the PSAPs could, in turn, impact the emergency message delivery process resulting in reduced public safety network functionality and poor customer satisfaction.

In an effort to address the aforementioned issues, the concepts and technologies disclosed herein provide a dynamic IoT service controller that is integrated within an M2M application server so as to evaluate the upstream emergency control plane signaling from several classes of M2M devices, to isolate them for specific emergency types, to analyze and subsequently group them based upon target service identifiers, and to adopt backoff mechanisms in completing their transactions towards the public safety authorities in an efficient manner.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for policy driven emergency traffic handling for M2M device communication will be described.

Referring now to FIG. 1, an illustrative operating environment 100 in which the various concepts and technologies disclosed herein can be implemented will be described. The illustrated operating environment 100 includes a plurality of user equipment devices ("UEs") 102A-102N (referred to herein collectively as UEs 102, or generally in the singular form as UE 102) operating in communication with a radio access network ("RAN") 104. The UEs 102 can communicate with the RAN 104 by way of one or more eNodeBs ("eNBs") 106. The operating environment 100 also includes a plurality of M2M devices 108A-108N (referred to herein collectively as M2M devices 108, or generally in the singular form as M2M device 108) also operating in communication with the RAN 104 by way of one or more eNBs 106 and/or a home eNB 110 (e.g., femtocell or small cell). For implementations in which an M2M device 108 connects to the home eNB 110 for access to the RAN 104, the home eNB 110 can route to the RAN 104 via an M2M gateway 112. The M2M GW 112 provides control capability to manage one or more home eNBs, such as the illustrated home eNB 110. The M2M GW 112, in some embodiments, is configured in accordance with 3GPP Technical Release 23.830 architecture. The M2M GW 112 can be configured in accordance with future 3GPP-defined architectures or can be configured in accordance with a proprietary architecture. Although the M2M GW 112 is shown as supporting only the home eNB 110, it is contemplated that the M2M GW 112 can support multiple home eNBs configured the same as or similar to the home eNB 110. Likewise, although only a single eNB 106 is shown, the RAN 104 can support multiple eNBs configured the same as or similar to the eNB 106.

Each of the UEs 102 can be a cellular phone, a feature phone, a smartphone, a mobile computing device, a tablet computing device, a portable television, a portable video game console, or the like capable of communicating with the RAN 104. The RAN 104 can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNB 110), pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated WWAN WI-FI and cellular technologies, and as such, the UEs 102 can be dual-mode devices.

The M2M devices 108, in some embodiments, form, at least in part, an IoT network 114. The M2M devices 108 can be deployed across various industry segments and embedded in a variety of locations, such as basements in multi-dwelling units, underground tunnels, manholes, subway systems, and/or the like, where there could be emergency situations that need to be handled to protect safety of humans, machines, and their interactions.

IoT is a concept of making physical objects, collectively "things," also referred to herein as the M2M devices 108, network addressable to facilitate interconnectivity for the exchange of data. The illustrated IoT network 114 can include any number of "things," including the M2M devices 108, for example. The M2M devices 108 can be or can include any "thing" that can collect data and that is configured to be network addressable so as to connect to and communicate with one or more networks, such as the RAN 104, over which to communicate the data to other connected devices, including, for example, computers, smartphones, tablets, vehicles, other M2M devices, combinations thereof, and the like. The M2M devices 108 can be deployed for consumer use and/or business use, and can find application in many industry-specific use cases. For example, the M2M devices 108 may find at least partial application in the following industries: automotive, energy, healthcare, industrial, retail, and smart buildings/homes. Those skilled in the art will appreciate the applicability of M2M-solutions in other industries as well as consumer and business use cases. For this reason, the applications of the M2M devices 108 described herein are used merely to illustrate some examples and therefore should not be construed as being limiting in any way. Although in the illustrated example the M2M devices 108 are shown as being in communication with one RAN (i.e., the RAN 104), the M2M devices 108 may be in communication with any number of access networks, including networks that incorporate collocated WWAN WI-FI and cellular technologies, and as such, one or more of the M2M devices 108 can be dual-mode devices.

The UEs 102 and the M2M devices 108 can be associated with an identity (also referred to herein as device identification). The identity can include device identification information such as, for example, International Mobile Subscriber Identity ("IMSI"), a Mobile Station International Subscriber Directory Number ("MSISDN"), an International Mobile Equipment Identity ("IMEI"), or a combination of an IMSI and an IMEI. The device identification information, in some embodiments, can additionally include a device category that specifies a category to which the device belongs. The device identification information can identify the device as being either a device for a standard mobile telecommunications services such a voice and/or data. The device identification information can alternatively identify the device as an IoT or other M2M device. In some embodiments, the M2M devices 108 can be category 1 ("CAT1"), CAT0, CATM based machine-type communication devices, or some combination thereof.

The RAN 104 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes a virtual RAN ("vRAN").

As used herein, a "base station" refers to a radio receiver and/or transmitter (collectively, transceiver) that is/are configured to provide a radio/air interface over which the UEs 102 and the M2M devices 108, can connect to a network 116. Accordingly, a base station is intended to encompass one or more base transceiver stations ("BTSs"), one or more NBs, one or more eNBs (e.g., the eNB 106), one or more home eNBs (e.g., the home eNB 110), one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102 and the M2M devices 108.

The illustrated network 116 includes two evolved packet core ("EPC") networks—an EPC for non-M2M devices 118 and an EPC for M2M devices 120. The EPC for non-M2M devices 118 can provide EPC network functions for non-M2M devices, such as the UEs 102, in accordance with 3GPP standards specifications. The EPC for M2M devices 120 can provide EPC network functions for M2M devices, such as the M2M devices 108, in accordance with 3GPP standards specifications and the concepts and technologies disclosed herein.

The EPC for M2M devices 120 can include one or more mobility management entities ("MME") 122, one or more M2M application servers ("AS") 124, one or more home subscriber servers ("HSS") 126, one or more evolved serving mobile location centers ("ESMLC") 128, one or more gateway mobile location centers ("GMLC") 130, one or more serving gateways ("SGW") 132, and one or more packet data network gateways ("PGWs") 134. Although not shown in the illustrated embodiment, the EPC for non-M2M devices 118 also can include EPC functions such as, for example, one or more MMEs, one or more HSSs, one or more ESMLCs, one or more GMLCs, one or more SGWs, one or more PGWs, combinations thereof, and the like.

The MME 122 can be configured in accordance with 3GPP standards specifications. The MME 122, in general, can perform operations to control signaling traffic related to mobility and security for access to the RANs 104. The MME 122 can perform other operations in accordance with the concepts and technologies disclosed herein, as will be described in detail below.

The HSS 126 can be configured in accordance with 3GPP standards specifications. The HSS 126 is a database that contains user-related information for users of devices. The HSS 126 can provide support functions to the MME 122 for mobility management, call and session setup, user authentication, and access authorization.

The SGW 132 can be configured in accordance with 3GPP standards specifications. The SGW 132 provides a point of interconnect between the radio-side (e.g., the RAN 104) and the EPC for M2M devices 120. The SGW 132 can serve devices by routing incoming and outgoing IP packets between the RANs 104 and the EPC for M2M devices 120.

The PGW 134 can be configured in accordance with 3GPP standards specifications. In the illustrated embodiment, the PGW 134 interconnects the EPC for M2M devices 120 to one or more other networks 136, such as, for example, one or more other public land mobile networks ("PLMNs"), one or more packet data networks ("PDNs") such as, for example, the Internet, one or more circuit-switched networks, combinations thereof, and/or the like. The PGW 134 routes IP packets to and from the other network(s) 136. The PGW 134 also performs operations such as IP address/prefix allocation, policy control, and charging.

In the illustrated embodiment, the SGW 132 and the PGW 134 are deployed as independent network components within the EPC for M2M devices 120. In other embodiments, a combined network component—referred to herein as a S/PGW—offering functionality of both the SGW 132 and the PGW 134 can be deployed.

The ESMLC 128 can be configured in accordance with 3GPP standards specifications. The ESMLC 128 can manage the coordination and scheduling of resources to acquire the location of the M2M devices 108.

The GMLC 130 can be configured in accordance with 3GPP standards specifications. The GMLC 130 interfaces with other entities in the EPC for M2M devices 120 and external systems, such as one or more PSAPs 138 operating in communication with the other network(s) 136 to provide location based services, including providing the location of devices such as the M2M devices 108.

The core network components of the EPC for M2M devices 120 and the EPC for non-M2M devices 118 can be implemented as physical network functions ("PNFs") having hardware and software components. The core network components can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). An example network virtualization platform ("NVP") architecture that might be used to implement various core network components embodied as VNFs is described herein below with reference to FIG. 6. Moreover, the core network components can be embodied as VNFs in one or more VNF pools, each of which can include a plurality of VNFs providing a particular core network function. For example, the MME 122, the M2M AS 124, the HSS 126, the ESMLC 128, the GMLC 130, the SGW 132, the PGW 134, or any combination thereof can be implemented as standalone VNFs or as a VNF operating in a VNF pool.

The PSAPs 138 are entities responsible for answering emergency messages and calls to an emergency telephone number, and for dispatching emergency services such as police, firefighters, and ambulance services. PSAPs can identify caller locations for landline calls and mobile calls. For landline calls, the PSAP utilizes the name, address, and telephone number associated with the landline telephone used to make the call. For mobile calls, the PSAP utilizes the address of the base station serving the mobile device that originated the call, telephone number, and estimated location of the mobile device.

In accordance with the concepts and technologies disclosed herein, the MME 122 and the M2M AS 124 are in communication via an MME-M2M AS control plane ("CP") interface 140. The MME-M2M AS CP interface 140 provides a direct interface on the control plane between the MME 122 and the M2M AS 124. The MME 122 can utilize the MME-M2M AS CP interface 140 to forward emergency messages (best shown in FIG. 2) received from the M2M devices 108 to the M2M AS 124, which can analyze, filter, prioritize, and map the emergency messages in accordance with one or more policies prior to forwarding the emergency messages to one or more of the PSAPs 138.

In LTE-based cellular systems, such as illustrated in the operating environment 100, the MME 122 acts as the nucleus for routing control plane signaling traffic to and from its peer nodes to provide a variety of mobility services. As LTE-EPC core networks evolve to support a variety of M2M devices—for example, the EPC for M2M devices 120 that supports the M2M devices 108—in getting connectivity to the network 116, the resultant signaling traffic demands intelligent and flexible control plane routing designs to be able to protect the incumbent services as well as in delivering next generation IoT services.

In a conventional LTE network, such as provided, in part, by the EPC for non-M2M devices 118, an MME performs critical mobility and session management functions to be able to successfully complete the signaling procedures interworking with its peer network elements. When a large volume of LTE-capable M2M devices, such as the M2M devices 108, with mixed category types connect to the RAN 104 and their serving MME (e.g., the MME 122), the M2M devices 108 could be distributed across multiple tracking areas ("TAs") that are configured in the MME 122. During emergency scenarios, when several of the M2M devices 108 across the multiple TAs need to attach to the network 116 to send/receive critical information, such as emergency information, the MME 122 could enter an overload condition if there are not adequate M2M device specific control plane procedural prioritization and throttling mechanisms in place.

When a large volume of the M2M devices 108 that belong to a specific service provider's network (e.g., the network 116) need to report their emergency alert messages in conjunction with other types of devices, such as the UEs 102, involved in active data exchange, the MME 122 should have the capability to distinguish between various types of machines/devices and traditional mobile users based on a set of systemic attributes and dynamic policies. The MME 122 can relay the emergency alert messages from all such devices towards the M2M AS 124 via control plane data transfer over the MME-M2M AS CP interface 140.

The lack of dynamic policy triggers and throttling controls for handling the M2M devices 108, integrated into the key control plane network elements, such as the MME 122, and their direct interworking with the M2M AS 124, might result in inefficient emergency communications amidst the broader category of M2M devices supported by the serving mobility network and associated IT application systems. Moreover, when a multitude of M2M devices 108 flood the MME 122 with emergency alerts to communicate towards their respective application providers, this could result in an emergency M2M traffic storm at the MME 122, which, in turn, has a direct impact on the application server. Emergency alerts, when relayed from the M2M AS 124 towards their respective PSAPs 138, without proper filtering mechanisms in place, could degrade the mobility network functionality and impact IoT services delivery.

In an effort to address the aforementioned issues, the concepts and technologies disclosed herein provide functionality that is integrated within the M2M AS 124 so as to evaluate the upstream emergency control plane signaling from several classes of M2M devices, to isolate them for specific emergency types, to analyze and subsequently group them based upon target service identifiers, and to adopt backoff mechanisms in completing their transactions towards the PSAPs 138 in an efficient manner.

A broader category of LTE based M2M devices could utilize a combination of control plane and user plane data transfer methods to communicate with the mobility core network, such as the illustrated EPC for M2M devices 120. Typically control plane procedures are more efficient for short data transmission as they can deliver such messages via signaling without need for more complex bearer establishment procedures. User plane methods could be selected by the network elements such as the MME 122 and the M2M AS 124 on-demand when there is a large data transfer depending on the content type, application requirements, and transport layer QoS.

During emergency situations in a given geographical area, a large volume of the M2M devices 108 could recover from a network failure and try to attach to the network 116. It is also possible that the M2M devices 108 are forced to report their emergency conditions due to an internal or external fault in their surrounding environment which has no bearing on the network 116. Under such circumstances, when the M2M devices 108 connect to the network 116 requesting emergency access, the M2M devices 108 could potentially flood the network elements and application systems, such as those shown in the EPC for M2M devices 120.

As the M2M devices 108 establish radio access and connectivity to the EPC for M2M devices 120, the MME 122 ensures that the M2M devices 108 are registered and attached to the network 116. When the M2M devices 108 send emergency messages, the MME 122 accepts these messages at the expense of shedding non-emergency requests and/or ongoing active calls and/or data sessions for other services. While all such emergency requests from all types of M2M devices may not be critical at a given time, the MME 122 could still route them to the M2M AS 124 for further upstream handling.

The M2M AS 124 can receive emergency messages via control plane communication from the MME 122 or MMES 122 in a given regional VNF pool. It is also possible that a regional pool of MMES 122 may communicate with more than one M2M AS 124 depending on the operator specific network scale, capacity, and engineering guidelines. If the M2M AS 124 does not employ any dynamic policy-based filtering of such emergency messages, the M2M AS 124 could flood the regional PSAPs 138 resulting in major network and service delivery impacts.

With the help of M2M AS 124 based intelligent device detection, filtering, and subsequent processing of a true emergency message among a class of emergency types (e.g., type of alarms, intensity, specific event driven short message alerts, and the like) associated with several class/groups of M2M devices 108, the M2M AS 124 can distinguish and prioritize true emergency messages received from the MME(s) 122 to be able to direct the true emergency messages to the proper one or more of the PSAPs 138. Emergency types can be defined based upon criticality or source of the emergency. For example, different emergency types can be "natural disaster," "medical emergency," "fire emergency," "public emergency," and the like. Such a dynamic message filtering and routing mechanism within the M2M AS 124 can prevent flooding of the PSAPs 138 as the PSAP 138 might not be able to handle such large ingress traffic volumes as well as duplicate emergency messages. This could result in impacts to mainstream emergency services that need to be avoided. Egress rate throttling in the M2M AS 124 in addition to the proactive filtering and prioritization can help mitigate such situations. The M2M AS 124 operations can include complex policies and rules to achieve smart throttling and filtering of emergency messages. By cross-analyzing a large set of data and information received during a flood of emergency messages, the M2M AS 124 will have the capability of rationalizing, prioritizing, and identifying duplicate messages or diverse messages signaling the same emergency.

In order for the M2M AS 124 to make such intelligent decisions, the M2M AS 124 can retrieve the entire context or a critical portion of the context of the M2M devices 108 on-demand via control plane message exchange towards each of the serving MMEs. Signaling message exchanges between the MME 122 and the M2M AS 124 could be handled via an IETF standards defined protocol, such as DIAMETER, or any other application mechanism. The critical portion of the context can include, but is not limited to, a user name, device identifier, device category, device priority, device mobility management state, location, some combination thereof, and/or the like.

Given the large volume of devices trying to communicate with the M2M AS 124, in some embodiments, the M2M AS 124 can retrieve the device context from a centralized database server (not shown) associated with the MME 122 or that is common to an MME pool. Such an architecture could simplify the context retrieval process in a large MME pool configuration. For a small scale deployment such as peer-to-peer configuration and/or the M2M AS 124 connected to few MME nodes, it is possible to resort to the control plane method described above.

Once the M2M AS 124 retrieves the device context, the M2M AS 124 can analyze the device context along with any ongoing signaling message exchanges with the MME 122, and can then trigger a dynamic policy that can consolidate emergency requests of a certain type from a certain class of M2M devices. For example, the M2M AS 124 can extract the device type, device priority, and the MM/SM state from the device context, and then correlate that with the emergency type being requested. Upon further analysis, the M2M AS 124 can evaluate whether emergency bearer establishment is required based on the content type to be exchanged with a given PSAP provider. Such triggers towards the EPC for M2M devices 120 could be initiated by the M2M AS 124 based upon the content received and processed to ensure mobility network resources (e.g., 122, 126, 128, 130, 132, 134, and/or the like) are effectively utilized to address and resolve the specific emergency needs in a timely manner.

For short message delivery, it could then format such communication towards a regional PSAP and send it as a unique short message rather than sending it as multiple single device specific short messages. This will prevent the PSAP from flooding by being able to receive the request, process it and respond to it promptly. Similarly, the AS could trigger the MME to setup a session establishment process for user plane data transfer if required on demand so that the devices can communicate with the IoT APN to their service providers accordingly.

When the network elements recover from failure during an emergency scenario in a given region and the M2M devices 108 need to attach to the network 116, the M2M devices 108 can send an attach request to signal to the MME 122 for connectivity to the M2M AS 124. The MME 122 can determine how to route this request based on its internal evaluation of the attach type and device capabilities.

For direct message exchange to occur between the MME 122 and the M2M AS 124 via control plane method, a new signaling interface—that is, the MME-M2M AS CP interface 140—is defined. The application protocol described above can operate over this interface to establish a peer-to-peer connectivity model for exchanging messages.

By providing a secure, fast and reliable communication channel between the MME 122 and the M2M AS 124, network operators can ensure that emergency triggers received by the MME 122 from the M2M devices 108 could promptly be delivered to the M2M AS 124. If DIAMETER protocol is chosen, then the operator could leverage one or more centralized DIAMETER routing agents to direct this traffic from the MME 122 towards the M2M AS 124.

The M2M AS 124 also can leverage connectivity with the MME 122 to request additional information from the M2M devices 108 via the user plane in order to better identify the nature of the emergency. In such scenarios, the M2M AS 124 can trigger the MME 122 to setup bearer establishment via a certain IoT/M2M access point name ("APN") of choice. The MME 122 could then proceed with a session establishment process and setup bearer services to transfer the data over the user plane to the M2M AS 124.

Since the M2M AS 124 also should be reachable via the user plane, the M2M AS 124 can interact with the PGW 134 via the existing SGi interface through a secure data connection. Alternatively, the M2M AS 124 could have a direct interface towards the PGW 134 for user plane data transfer. A modified Rx interface could be used between the M2M AS 124 and one or more policy and charging rules functions ("PCRFs") for exchanging dynamic rules created by the M2M AS 124. The PCRF could then trigger the rules to the PGW 134 for dedicated bearer initiation to extract certain key data on-demand with a desired QoS.

Figure 2:
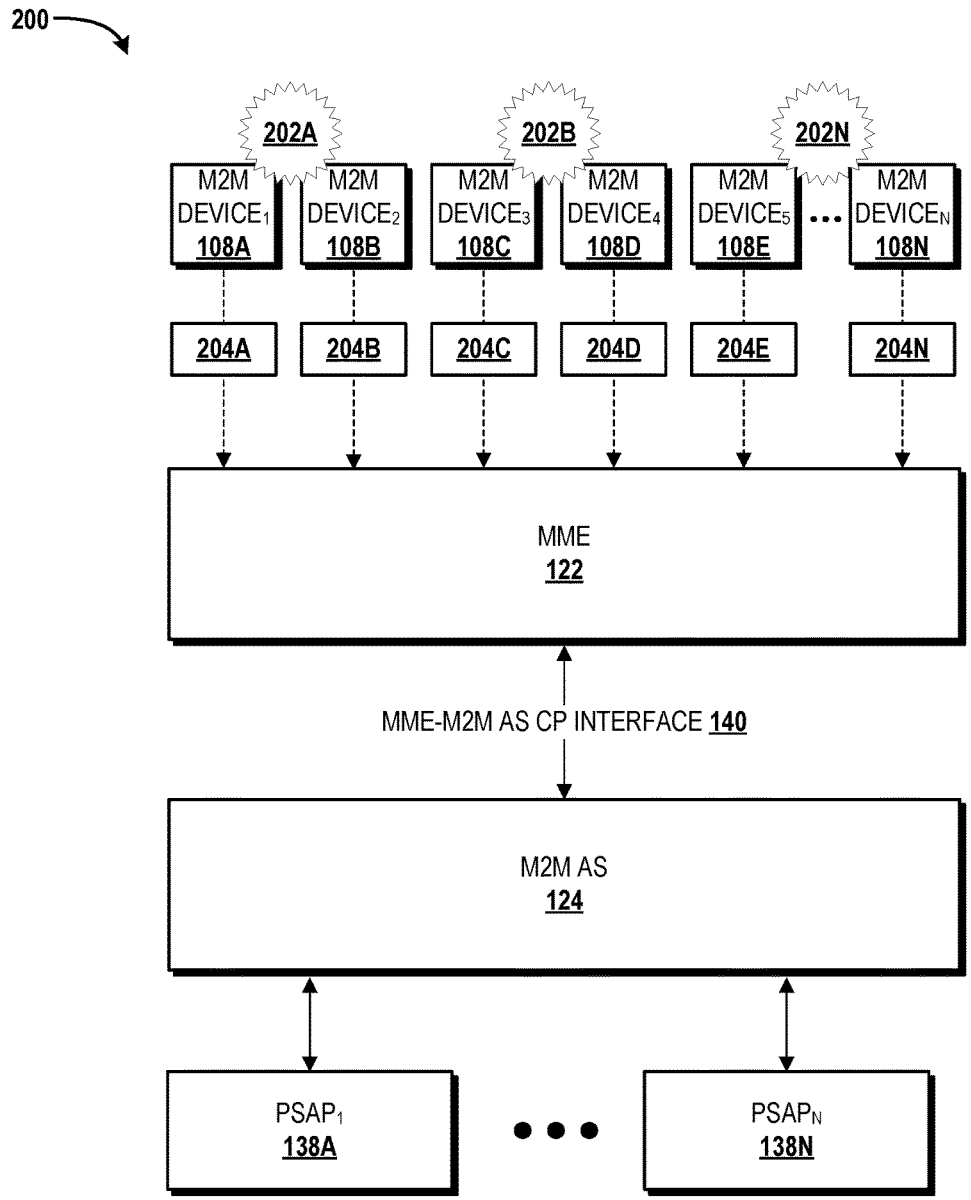
FIG. 2 is a block diagram illustrating additional aspects of an MME-M2M application server control plane interface, according to an illustrative embodiment.

Turning now to FIG. 2, a block diagram illustrating additional aspects (generally shown at 200) of the MME-M2M AS CP interface 140 will be described, according to an illustrative embodiment. FIG. 2 shows the M2M devices 108, the MME 122, the M2M AS 124, the PSAPs 138, and the MME-M2M AS CP interface 140 introduced above with reference to FIG. 1.

In the illustrated example, the M2M devices 108A, 108B are exposed to an emergency event 202A; the M2M devices 108C, 108D are exposed to an emergency event 202B; and the M2M devices 108E, 108N are exposed to an emergency event 202N. The emergency events 202A-202N (hereinafter referred to collectively as emergency events 202, or in the singular as emergency event 202) can be any bona fide emergency or any situation an individual or entity perceives to be an emergency (as is typical of 9-1-1 service). By way of example, and not limitation, the emergency events 202 can be any serious situation where a law enforcement officer, fire fighter, or emergency medical help is needed right away and a call or other communication with the National Emergency Number Association ("NENA"; also known as The 9-1-1 Association) is warranted. The emergency events 202 can be a real-world disaster and/or crisis such as, for example, a hurricane, tsunami, earthquake, tornado, other natural disaster, disease epidemic, and the like.

In response to an emergency event 202, the M2M devices 108 can generate emergency messages 204A-204N (hereinafter referred to collectively as emergency messages 204, or in the singular as emergency message 204) directed to the PSAPs 138. In this example, the emergency messages 204A, 204B can include data associated with the emergency event 202A; the emergency messages 204C, 204D can include data associated with the emergency event 202B; and the emergency messages 204E, 204N can include data associated with the emergency event 202N. It should be understood that, in real-world implementations, the number of emergency messages 204 will be much greater in response to a given emergency event 202. The emergency messages 204 will likely originate from M2M devices 108 operating across various verticals. The emergency messages 204 can emanate from a variety of industry verticals, including, for example, smart lighting, smart meters, smart cities, eHealth, and the like that can communicate with public services whether it is by leveraging LTE-based cellular and/or other access networking technologies (e.g., WI-FI).

The MME 122 can receive the emergency messages 204 from the M2M device 204 and can forward the emergency messages 204 to the M2M AS 124 over the MME-M2M AS CP interface 140. The M2M AS 124 can dynamically throttle ingress and egress rates of control plane message interactions with the MME 122 and the PSAP(s) 138. The M2M AS 134 processes incoming emergency requests from the MME 122 originating from the M2M devices 108 and creates an internal mapping table based upon device type, device priority, device category, emergency type, device location, application/content request for a given emergency, and QoS. The M2M AS 124 can sort through duplicate requests from the M2M devices 108. The M2M AS 124 can make intelligent routing decisions by filtering duplicate emergency requests or false alarms from critical emergency requests. The M2M AS 124 can utilize priority and policy driven rules based upon the above constraints. The M2M AS 124 can route filtered emergency requests towards the appropriate one or more PSAPs 138 based upon geo-mapping created in the mapping table.

Figure 3:
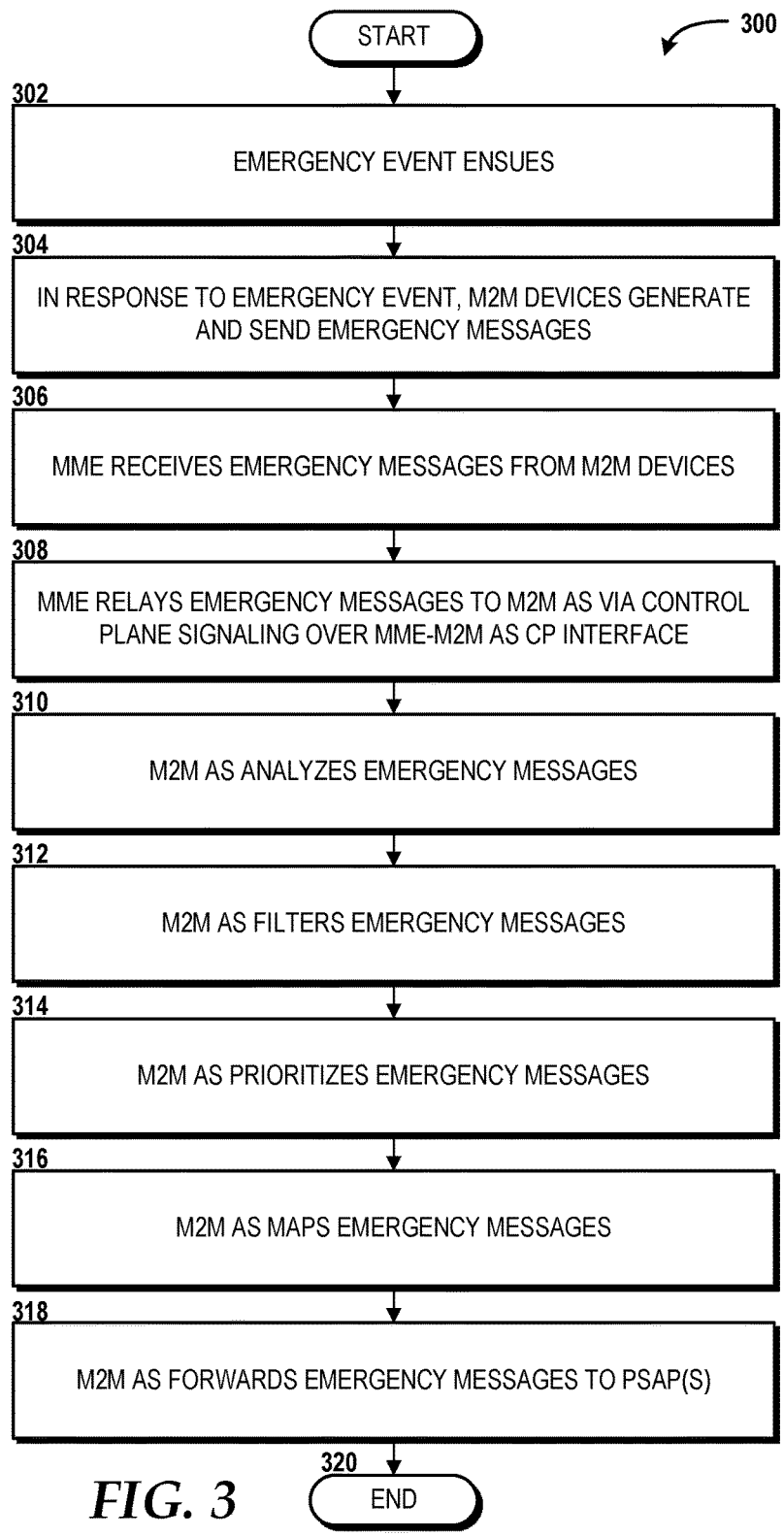
FIG. 3 is a flow diagram illustrating a method for policy driven emergency traffic handling for M2M device communication, according to an illustrative embodiment.

Turning now to FIG. 3, aspects of a method 300 for policy driven emergency traffic handling for M2M device communication will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 300 is described as being performed, at least in part, by the M2M AS 124 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIGS. 1 and 2. The method 300 begins at operation 302, where an emergency event 202 ensues. From operation 302, the method 300 proceeds to operation 304, where, in response to the emergency event 202, the M2M devices 108 generate and send emergency messages 204 directed to the network 116. From operation 304, the method 300 proceeds to operation 306, where the MME 122 receives the emergency messages 204 from the M2M devices 108. From operation 306, the method 300 proceeds to operation 308, where the MME 122 relays the emergency messages 204 to the M2M AS 124 via control plane signaling over the MME-M2M AS CP interface 140. From operation 308, the method 300 proceeds to operation 310, where the M2M AS 124 analyzes the emergency messages 204. From operation 310, the method 300 proceeds to operation 312, where the M2M AS 124 filters the emergency messages 204. From operation 312, the method 300 proceeds to operation 314, where the M2M AS 124 prioritizes the emergency messages 204. From operation 314, the method 300 proceeds to operation 316, where the M2M AS 124 maps the emergency messages 204 to the PSAPs 138. From operation 316, the method 300 proceeds to operation 318, where the M2M AS 124 forwards the emergency messages 204 to the PSAPs 138 in accordance with the mapping table. From operation 318, the method 300 proceeds to operation 320, where the method 300 ends.

Figure 4:
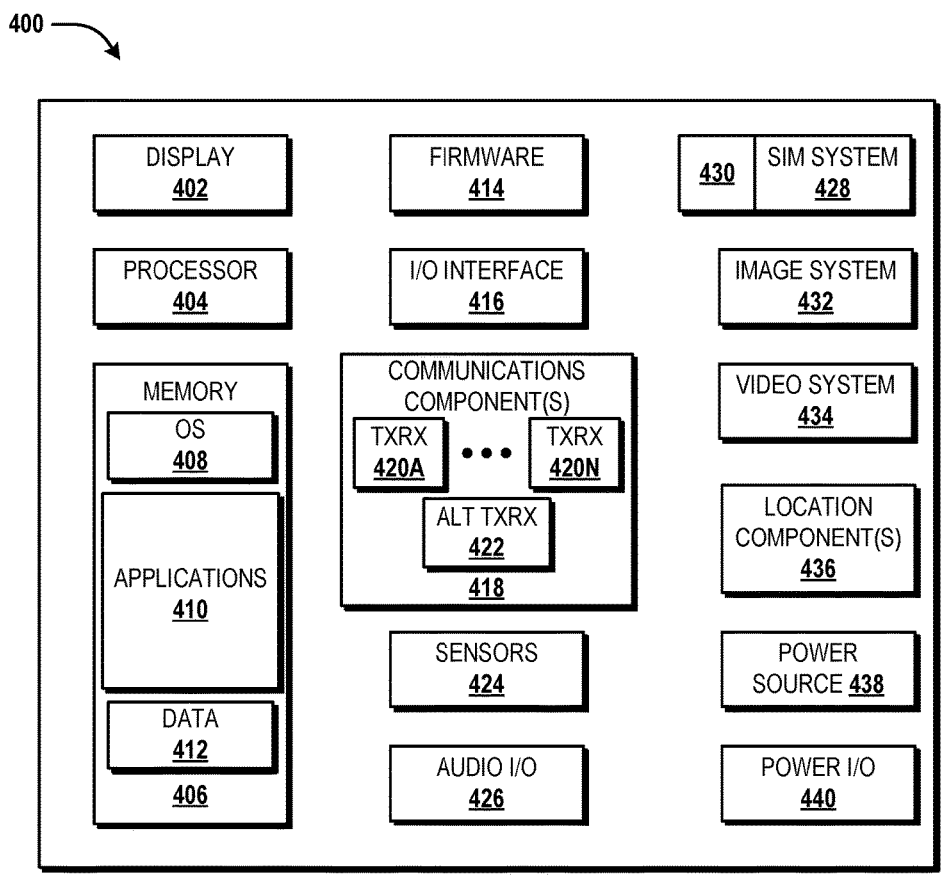
FIG. 4 is a block diagram illustrating an example mobile device capable of implementing aspects of the embodiments disclosed herein.

Turning now to FIG. 4, an illustrative mobile device 400 and components thereof will be described. In some embodiments, one or more of the UEs 102 (shown in FIG. 1) can be configured like the mobile device 400. In some embodiments, one or more of the M2M devices 108 can be configured like the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UP") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 408 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
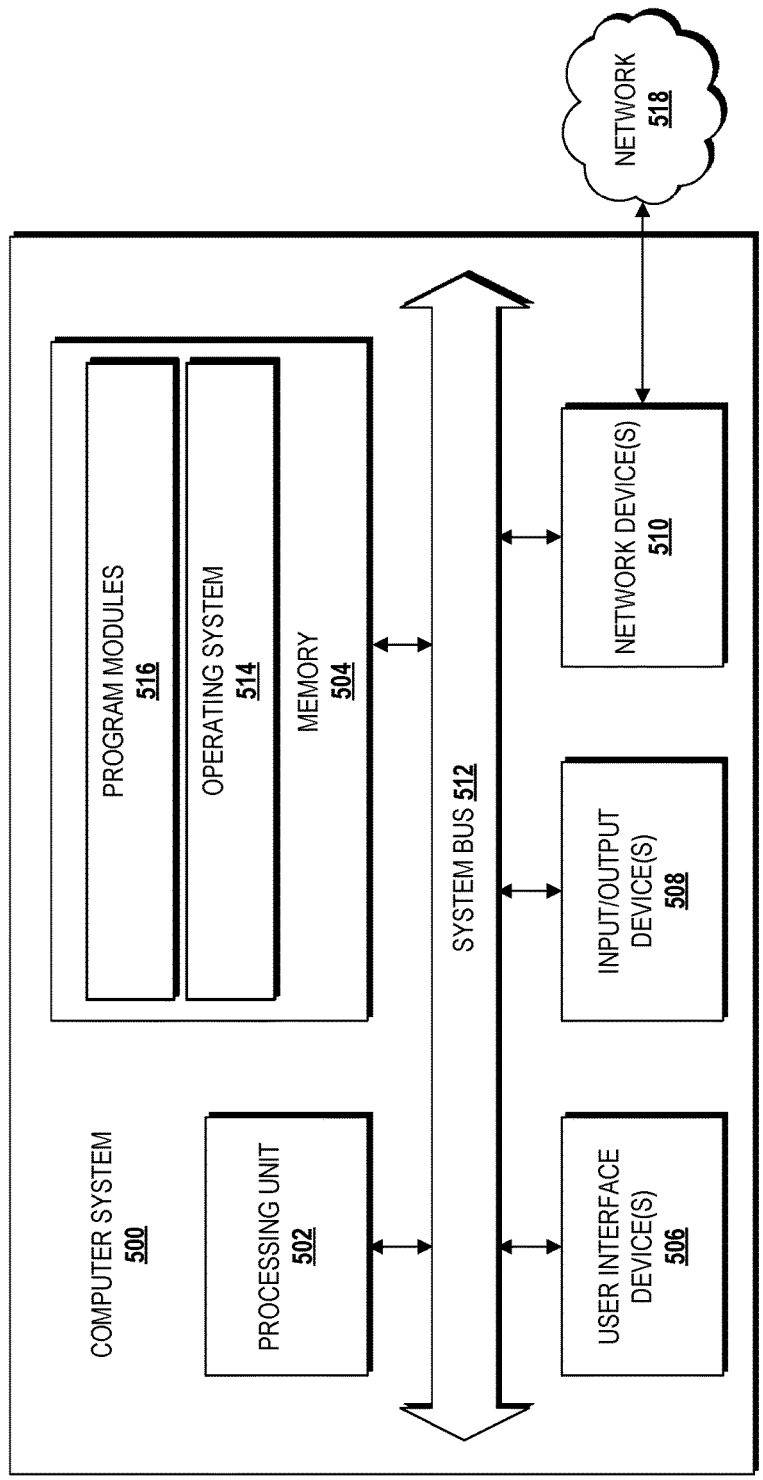
FIG. 5 is a block diagram illustrating an example computer system capable of implementing aspects of the embodiments presented herein.

Turning now to FIG. 5 is a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518, such as the network 116. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN").

Figure 6:
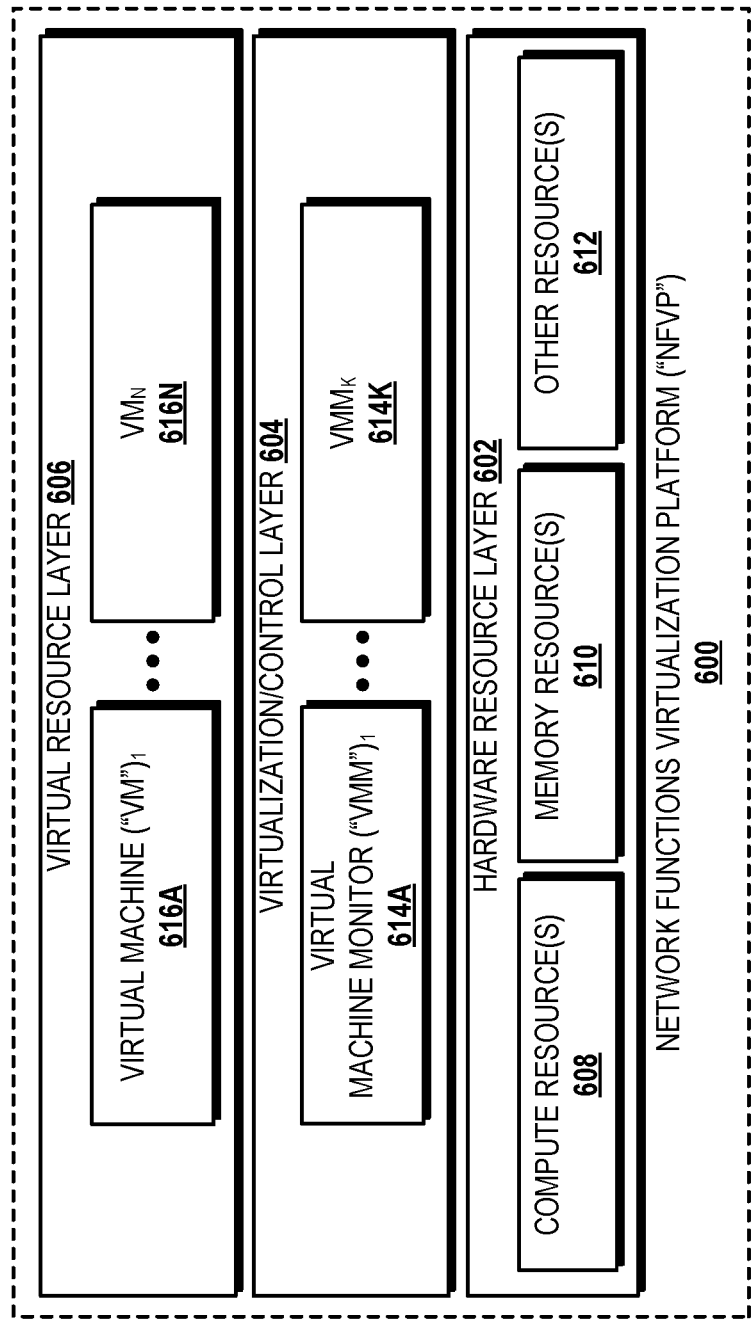
FIG. 6 is a block diagram illustrating an example network functions virtualization platform ("NFVP") capable of implementing aspects of the embodiments presented herein.

Turning now to FIG. 6, a network functions virtualization platform ("NFVP") 600 will be described, according to an exemplary embodiment. The architecture of the NFVP 600 can be used to implement VNFs of the PNFs disclosed herein. For example, the NFVP 600 can be utilized to implement the MME 122, the M2M AS 124, the HSS 126, the ESMLC 128, the GMLC 130, the SGW 132, the PGW 134, other PNFs, or some combination thereof.

The NFVP 600 is a shared infrastructure that can support multiple services and network applications. The illustrated NFVP 600 includes a hardware resource layer 602, a virtualization/control layer 604, and a virtual resource layer 606 that work together to perform operations as will be described in detail herein.

The hardware resource layer 602 provides hardware resources, which, in the illustrated embodiment, include one or more compute resources 608, one or more memory resources 610, and one or more other resources 612. The compute resource(s) 608 can include one or more hardware components that perform computations to process data, and/or to execute computer-executable instructions of one or more application programs, operating systems, and/or other software. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 608 can be or can include one or more hardware components architected in accordance with an ARM architecture, available for license from ARM HOLDINGS of Cambridge, United Kingdom. Alternatively, the compute resources 608 can be or can include one or more hardware components architected in accordance with an x66 architecture, such an architecture available from INTEL CORPORATION of Mountain View, Calif., and others. Those skilled in the art will appreciate the implementation of the compute resources 608 can utilize various computation architectures, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 602 can be virtualized by one or more virtual machine monitors ("VMMs") 614A-614K (also known as "hypervisors"; hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616"). Each of the VMs 616 can execute one or more applications.

Figure 7:
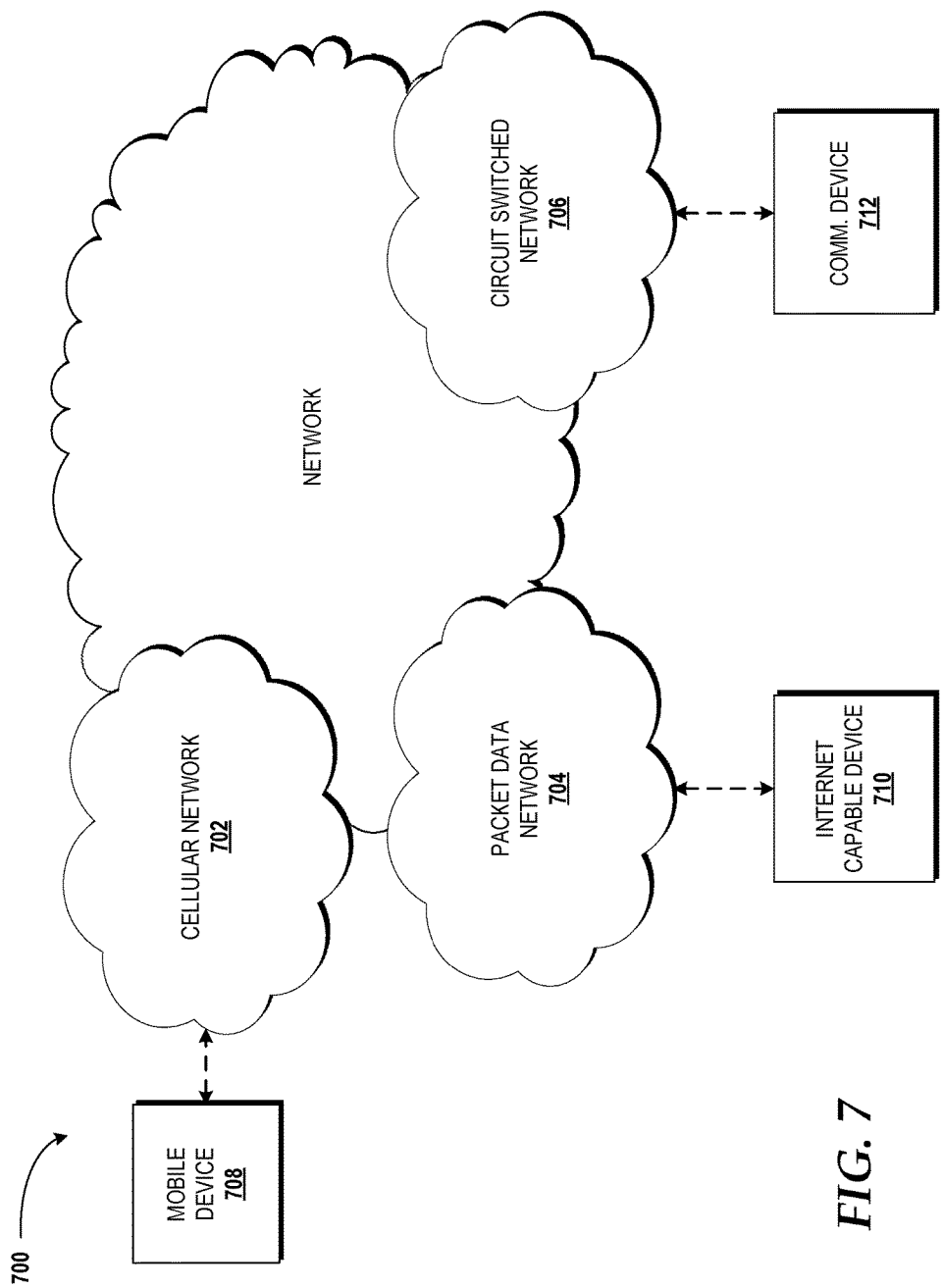
FIG. 7 is a block diagram illustrating an example network capable of implementing aspects of the embodiments presented herein.

Turning now to FIG. 7, details of a network 700 are illustrated, according to an illustrative embodiment. In some embodiments, the network 700 includes the network 116 and/or the other networks 136. The network 700 includes a cellular network 702, a packet data network 704, for example, the Internet, and a circuit switched network 706, for example, a PSTN. The cellular network 702 includes various components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the UE device(s) 102, the M2M devices 108, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a POTS. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network is used to refer broadly to any combination of the networks 702, 704, 706 shown in FIG. 7 and/or the network 116. It should be appreciated that substantially all of the functionality described with reference to the network 116 can be performed by the cellular network 702, the packet data network 704, and/or the circuit switched network 706, alone or in combination with other networks, network elements, and the like.

Based on the foregoing, it should be appreciated that concepts and technologies directed to policy driven emergency traffic handling for M2M device communication have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A machine-to-machine application server comprising:
   a processor; and
   memory that includes instructions that, when executed by the processor, cause the machine-to-machine application server to perform operations comprising:
      receiving, from a mobility management entity over a control plane interface of an evolved packet core network, a plurality of emergency messages originating from a plurality of machine-to-machine devices that form, at least in part, an Internet of Things (IoT) network, wherein the plurality of emergency messages are generated by the plurality of machine-to-machine devices to request emergency access to the evolved packet core network in response to an emergency event, wherein the control plane interface comprises a mobility management entity to machine-to-machine application service control plane interface dedicated to control plane message interactions between the mobility management entity and the machine-to-machine application server, throttling ingress rates of the control plane message interactions with the mobility management entity, filtering the plurality of emergency messages based on a policy to remove duplicate messages of the plurality of emergency messages and to create a clean group of emergency messages from the plurality of emergency messages, and forwarding the clean group of emergency messages from the evolved packet core network to a public safety answering point, wherein forwarding the clean group of emergency messages comprises throttling an egress rate of the clean group of emergency messages to the public safety answering point.

2. The machine-to-machine application server of claim 1, wherein each emergency message of the plurality of emergency messages comprises data comprising a type of the emergency event, a priority of the emergency message, an identity of a corresponding one of the plurality of machine-to-machine devices, a location of the corresponding one of the plurality of machine-to-machine devices, a device category, and a device type of the corresponding one of the plurality of machine-to-machine devices.

3. The machine-to-machine application server of claim 2, wherein the operations further comprise analyzing the plurality of emergency messages to extract the data.

4. The machine-to-machine application server of claim 3, wherein the operations further comprise prioritizing at least a portion of the plurality of emergency messages.

5. The machine-to-machine application server of claim 4, wherein the operations further comprise creating a mapping table based upon the data.

6. The machine-to-machine application server of claim 5, wherein forwarding the clean group of emergency messages to the public safety answering point comprises forwarding the clean group of emergency messages to the public safety answering point based upon the mapping table.

7. A computer-readable storage medium having instructions of a machine-to-machine application server stored thereon that, when executed by a processor, cause the machine-to-machine application server to perform operations comprising:

receiving, from a mobility management entity over a control plane interface of an evolved packet core network, a plurality of emergency messages originating from a plurality of machine-to-machine devices that form, at least in part, an Internet of Things (IoT) network, wherein the plurality of emergency messages are generated by the plurality of machine-to-machine devices to request emergency access to the evolved packet core network in response to an emergency event, wherein the control plane interface comprises a mobility management entity to machine-to-machine application service control plane interface dedicated to control plane message interactions between the mobility management entity and the machine-to-machine application server, throttling ingress rates of the control plane message interactions with the mobility management entity, filtering the plurality of emergency messages based on a policy to remove duplicate messages of the plurality of emergency messages and to create a clean group of emergency messages from the plurality of emergency messages, and forwarding the clean group of emergency messages from the evolved packet core network to a public safety answering point, wherein forwarding the clean group of emergency messages comprises throttling an egress rate of the clean group of emergency messages to the public safety answering point.

8. The computer-readable storage medium of claim 7, wherein each emergency message of the plurality of emergency messages comprises data comprising a type of the emergency event, a priority of the emergency message, an identity of a corresponding one of the plurality of machine-to-machine devices, a location of the corresponding one of the plurality of machine-to-machine devices, a device category, and a device type of the corresponding one of the plurality of machine-to-machine devices.

9. The computer-readable storage medium of claim 8, wherein the operations further comprise analyzing the plurality of emergency messages to extract the data.

10. The computer-readable storage medium of claim 9, wherein the operations further comprise prioritizing at least a portion of the plurality of emergency messages.

11. The computer-readable storage medium of claim 10, wherein the operations further comprise creating a mapping table based upon the data.

12. The computer-readable storage medium of claim 11, wherein forwarding the clean group of emergency messages to the public safety answering point comprises forwarding the clean group of emergency messages to the public safety answering point based upon the mapping table.

13. A method comprising:

receiving, by a machine-to-machine application server comprising a processor of an evolved packet core network, from a mobility management entity over a control plane interface of the evolved packet core network, a plurality of emergency messages originating from a plurality of machine-to-machine devices that form, at least in part, an Internet of Things (IoT) network, wherein the plurality of emergency messages are generated by the plurality of machine-to-machine devices to request emergency access to the evolved packet core network in response to an emergency event, and wherein the control plane interface comprises a mobility management entity to machine-to-machine application service control plane interface dedicated to control plane message interactions between the mobility management entity and the machine-to-machine application server;

throttling, by the machine-to-machine application server, ingress rates of the control plane message interactions with the mobility management entity;

filtering, by the machine-to-machine application server of the evolved packet core network, the plurality of emergency messages based on a policy to remove duplicate messages of the plurality of emergency messages and to create a clean group of emergency messages from the plurality of emergency messages; and forwarding, by the machine-to-machine application server, the clean group of emergency messages from the evolved packet core network to a public safety answering point, wherein forwarding the clean group of emergency messages comprises throttling an egress rate of the clean group of emergency messages to the public safety answering point.

14. The method of claim 13, wherein each emergency message of the plurality of emergency messages comprises data comprising a type of the emergency event, a priority of the emergency message, an identity of a corresponding one of the plurality of machine-to-machine devices, a location of the corresponding one of the plurality of machine-to-machine devices, a device category, and a device type of the corresponding one of the plurality of machine-to-machine devices.

15. The method of claim 14, further comprising analyzing the plurality of emergency messages to extract the data.

16. The method of claim 15, further comprising prioritizing at least a portion of the plurality of emergency messages.

17. The method of claim 16, further comprising creating a mapping table based upon the data.

18. The method of claim 17, forwarding the clean group of emergency messages to the public safety answering point comprises forwarding the clean group of emergency messages to the public safety answering point based upon the mapping table.

* * * * *